United States Patent
Li et al.

(10) Patent No.: US 12,465,874 B2
(45) Date of Patent: Nov. 11, 2025

(54) METHOD FOR EXTRACTING AND SEPARATING VARIOUS COMPONENTS FROM FLAXSEED MEAL BASED ON SUBCRITICAL COMPOSITE SOLVENT

(71) Applicant: Jinan University, Guangzhou (CN)

(72) Inventors: Ying Li, Guangzhou (CN); Ning Zhang, Guangzhou (CN); Yong Wang, Guangzhou (CN)

(73) Assignee: Jinan University, Guangzhou (CN)

( * ) Notice: Subject to any disclaimer, the term of this patent is extended or adjusted under 35 U.S.C. 154(b) by 108 days.

(21) Appl. No.: 18/011,529

(22) PCT Filed: Jul. 18, 2022

(86) PCT No.: PCT/CN2022/104399
§ 371 (c)(1),
(2) Date: Dec. 20, 2022

(87) PCT Pub. No.: WO2023/011102
PCT Pub. Date: Feb. 9, 2023

(65) Prior Publication Data
US 2024/0115971 A1    Apr. 11, 2024

(30) Foreign Application Priority Data
Aug. 4, 2021  (CN) .......................... 202110890684.7

(51) Int. Cl.
| | | |
|---|---|---|
| *B01D 11/02* | (2006.01) | |
| *B01D 3/08* | (2006.01) | |
| *B01D 15/18* | (2006.01) | |
| *B01D 15/42* | (2006.01) | |
| *C07H 1/06* | (2006.01) | |
| *C07H 15/203* | (2006.01) | |
| *C08B 37/00* | (2006.01) | |
| *C11B 1/10* | (2006.01) | |
| *C11B 3/00* | (2006.01) | |

(52) U.S. Cl.
CPC .......... *B01D 11/0288* (2013.01); *B01D 3/085* (2013.01); *B01D 11/028* (2013.01); *B01D 11/0292* (2013.01); *B01D 15/1871* (2013.01); *B01D 15/426* (2013.01); *C07H 1/06* (2013.01); *C07H 15/203* (2013.01); *C08B 37/006* (2013.01); *C11B 1/10* (2013.01); *C11B 3/006* (2013.01)

(58) Field of Classification Search
CPC ........ B01D 15/426; B01D 11/02; C07H 1/06; C08B 37/006; C11B 1/10; C11B 13/006; Y02P 20/54
See application file for complete search history.

(56) References Cited

PUBLICATIONS

CN106635389A. 2017, machine translation. (Year: 2017).*

* cited by examiner

*Primary Examiner* — Layla D Berry
(74) *Attorney, Agent, or Firm* — Jose Cherson Weissbrot

(57) ABSTRACT

Disclosed in the present disclosure is a method for extracting and separating various components from flaxseed meal based on a subcritical composite solvent, including the following steps: adding an extraction agent to flaxseed meal for subcritical extraction to obtain a crude flax lignan extract and crude flaxseed oil in one step, where the extraction agent includes n-butane and anhydrous ethanol at a volume ratio of 1:1; adding n-hexane to the crude flaxseed oil for fractional extraction, and conducting rotary evaporation to obtain flaxseed oil; and subjecting the flaxseed meal used to hot water extraction to obtain flaxseed gum. In the present disclosure, the subcritical composite solvent used in an extraction process can replace a large number of organic reagents used in a traditional extraction process, and has the characteristics of good solvent effect, environmental friendliness, recyclability, and low burden on the environment.

10 Claims, 5 Drawing Sheets

METHOD FOR EXTRACTING AND SEPARATING VARIOUS COMPONENTS FROM FLAXSEED MEAL BASED ON SUBCRITICAL COMPOSITE SOLVENT

TECHNICAL FIELD

The present disclosure belongs to the field of extraction and separation of active components of plants, and specifically relates to a method for extracting and separating various components from flaxseed meal based on a subcritical composite solvent.

BACKGROUND

Flaxseed oil is rich in α-linolenic acid, VE, and other nutrients. Cake meal obtained after flaxseeds are pressed still contains residual oil, lignans, polysaccharides (gum), proteins, and other active components. As a main by-product obtained after processing of the flaxseed oil, the flaxseed cake meal is usually only used as animal feed, a fertilizer, or a waste material for treatment, so that resources are not fully utilized.

At present, the flaxseed oil is used as a main flaxseed product in China, products have simplification and high homogenization, and the development of functional flaxseed food ingredients has gradually become a hotspot. Technologies for preparation of oil include a pressing method, a solvent extraction method, and a supercritical $CO_2$ extraction method. The pressing method has low yield and limited processing capacity, and the solvent extraction method is usually used to make up the defects. However, oil obtained by the solvent extraction method has difference in quality and the risk of solvent residues. The newly developed supercritical $CO_2$ extraction method has high yield and excellent quality. However, the industrial production cost is high, and operations are required to be conducted by professionals.

Except for the flaxseed oil, few researches have been conducted on efficient and environment-friendly extraction of other active components with high added values, such as a flax lignan. At present, the flax lignan exists in flaxseed shells, and technologies for extraction of the flax lignan mainly include an organic solvent extraction method, a microwave-assisted extraction method, and an ultrasonic-assisted extraction method. As the main technology for extraction of the flax lignan at present, the organic solvent method has the characteristics of simple operation and low equipment requirements, and also has the disadvantages of high consumption of an organic solvent, long extraction time, and low yield.

According to the microwave-assisted or ultrasonic-assisted extraction method based on the solvent extraction method, the extraction time can be greatly shortened, and the extraction rate of the flax lignan can be increased to a certain extent. However, the microwave-assisted or ultrasonic-assisted extraction method has certain requirements for equipment and operators, and still has a long way from industrialization.

Up to now, few reports have been conducted on efficient and comprehensive utilization technologies for obtaining flaxseed gum by extracting the flax lignan and the flaxseed oil at the same time in one step with the flaxseed meal as a raw material.

SUMMARY

An objective of the present disclosure is to provide a method for extracting and separating various components from flaxseed meal based on a subcritical composite solvent. According to the method of the present disclosure, when the composite extraction solvent and extraction conditions are optimized, two natural extracts including a flaxseed lignan and oil are obtained at the same time, and a waste residue obtained after extraction is continuously subjected to extraction to obtain a flaxseed polysaccharide (gum). The content of unsaturated fatty acids in the flaxseed oil extracted by the method is as high as 90%, and the content of fatty acids and the composition of glycerides are almost the same as those of refined flaxseed oil.

The objective of the present disclosure is realized by adopting the following technical solutions.

A method for extracting and separating various components from flaxseed meal based on a subcritical composite solvent includes the following steps:

(1) adding an extraction agent to flaxseed meal for subcritical extraction, and after the extraction is completed, obtaining a crude lignan extract in an upper extract and crude flaxseed oil in a lower extract, where the extraction agent includes n-butane and anhydrous ethanol at a volume ratio of 1:1; the anhydrous ethanol is added to adjust the polarity of the composite solvent, so that the dissolution of polar phenols in the flax meal is facilitated, and the extraction efficiency is improved;

the subcritical extraction is preferably conducted at 69° C. for 2 hours;

the obtained crude lignan extract is subjected to rotary evaporation to remove the residual extraction agent, and then subjected to centrifugation to obtain a supernatant containing a lignan polymer; the supernatant is subjected to alkali treatment, acid neutralization, chromatography with macroporous adsorption resin, and column chromatography with silica gel to obtain a lignan with a purity of greater than 90%;

the alkali treatment preferably includes adding a 0.1 M sodium hydroxide solution for alkali hydrolysis at room temperature for at least 24 hours; the acid neutralization preferably includes adding acetic acid until the pH value of the system is 7;

the chromatography with macroporous adsorption resin preferably includes adsorption with AB-8 macroporous resin and elution with an ethanol solution with a V/V percentage of 70% to obtain an eluent containing a lignan;

and the column chromatography includes conducting elution with dichloromethane, a mixture of dichloromethane, methanol, and glacial acetic acid at a ratio of 10:1:0.1 (V/V/V), a mixture of dichloromethane, methanol, and glacial acetic acid at a ratio of 10:2:0.1 (V/V/V), and a mixture of dichloromethane, methanol, and glacial acetic acid at a ratio of 10:2.5:0.1 (V/V/V) in sequence, and collecting all tube solutions including a secoisolariciresinol diglucoside (SDG) component;

(2) adding n-hexane to the crude flaxseed oil obtained in step (1) for fractional extraction to obtain a supernatant, and subjecting the supernatant to concentration by rotary evaporation until the volume is unchanged to obtain flaxseed oil, where the content of unsaturated fatty acids in the flaxseed oil extracted by the method is as high as 90%;

and the extraction is preferably conducted at 70° C. for 3-5 hours; and (3) subjecting the flaxseed meal used after step (1) to hot water extraction to obtain flaxseed gum, where the hot water extraction includes water extraction at 70° C., 400 rpm, and a material-liquid ratio of 1:25 for 2 hours.

Compared with the prior art, the present disclosure has the following advantages and effects.

(1) In the present disclosure, the subcritical composite solvent used in an extraction process can replace a large number of organic reagents used in a traditional extraction process, and has the characteristics of good solvent effect, environmental friendliness, recyclability, and low burden on the environment, so that the risk of harm caused by the organic reagents to operators and the natural environment in the process can be reduced. Meanwhile, the subcritical extraction in the present disclosure has lower requirements for operators and professionals.

(2) In the present disclosure, the flax lignan, namely, secoisolariciresinol diglucoside (SDG), obtained after extraction, has good oxidation resistance, osteoporosis resistance, and other biological activities, has a purity of greater than 90% after purification, and can be further developed into functional ingredients of foods or health care products. Compared with the prior art, the extraction in the present disclosure has the advantages that the problem of a large amount of organic solvents used and residues in a traditional extraction process is avoided to a maximum extent, the flaxseed oil is obtained while operation units are reduced, the cost is reduced, and the efficiency is improved.

(3) The flaxseed oil extracted in the present disclosure is different from that extracted with the traditional organic solvents. Since physical characteristics such as viscosity, diffusion coefficient, and polarity of the composite solvent are changed with the increase of temperature and pressure under subcritical conditions, the dissolution ability of the composite solvent can be similar to that of the organic solvents, so that the quality of the oil is ensured, and meanwhile the problem of a large amount of organic solvents used and residues in an extraction process is avoided.

(4) After the flaxseed lignan and the oil are extracted in one step in the present disclosure, the flaxseed gum can also be obtained by a hot water extraction method. Materials are derived from natural sources, the operation process is simple, conditions are mild, no large equipment is required, and the cost is low. Apparent characteristics of the obtained flaxseed gum are similar to those of flaxseed gum obtained by prior art.

DETAILED DESCRIPTION

Figure 1:
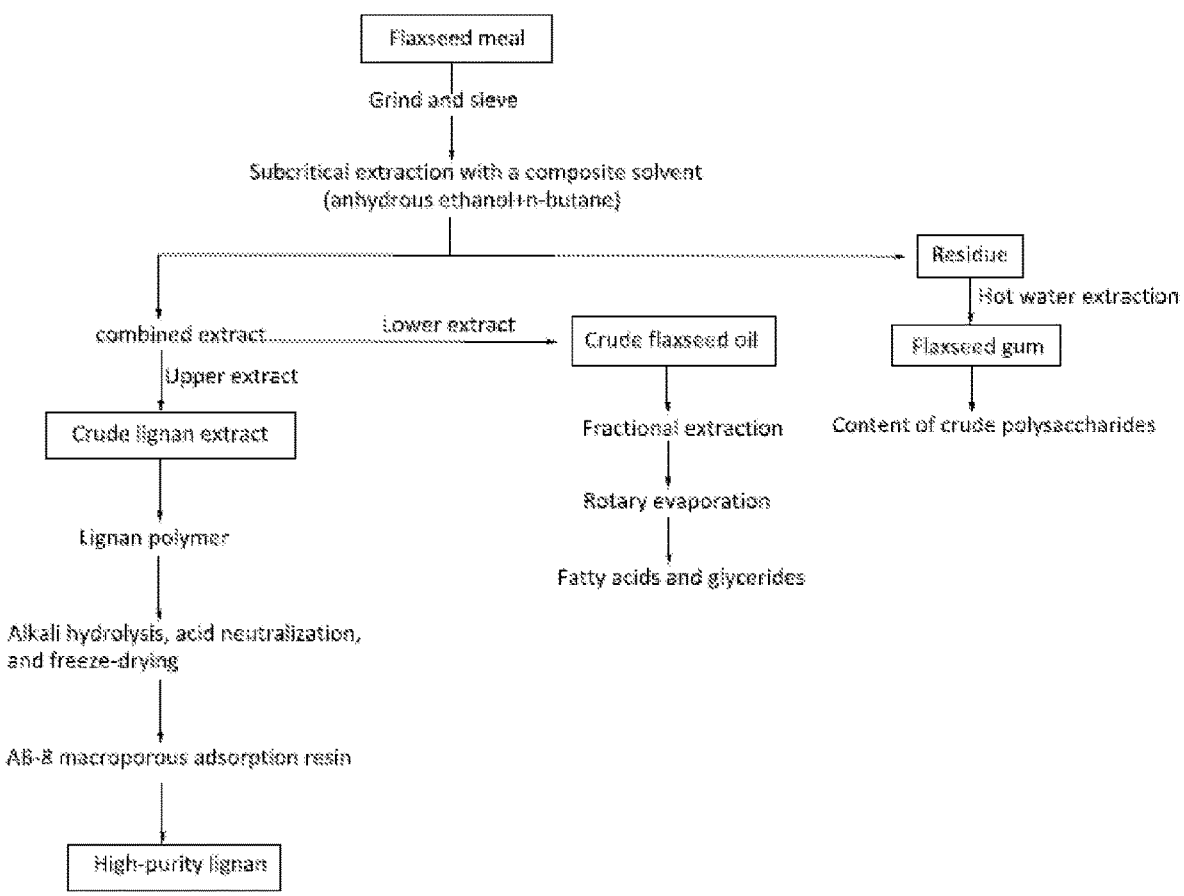
FIG. 1 is a technical roadmap of a method for extraction, separation, purification, and analysis in the present disclosure.

The present disclosure is further described in detail below in conjunction with examples and accompanying drawings, but the embodiments of the present disclosure are not limited herein.

In the present disclosure, the total phenol content is determined by using a Folin-phenol reagent method. The method is specifically as follows.

Gallic acid is used as a standard product control. 20 mg of a gallic acid standard product is weighed, dissolved in distilled water, and then transferred into a 100 mL volumetric flask. Then, distilled water is added to a constant volume until the lowest part of a concave liquid level reaches a certain scale line, and shaken uniformly to obtain a gallic acid stock solution.

The stock solution is precisely weighed in 1.0 mL, 2.0 mL, 3.0 mL, 4.0 mL, and 5.0 mL, and separately put into a 10 mL volumetric flask. Water is added to reach a certain scale line, and shaken uniformly to obtain a series of gallic acid standard solutions with different concentrations.

1) Preparation of blank solutions: 1.0 mL of the gallic acid standard solutions are separately transferred into a test tube. 5.0 mL of a Folin-phenol reagent is added, and shaken uniformly. After a reaction for 3-8 minutes, 4.0 mL of a 7.5% $Na_2CO_3$ solution is added, and shaken uniformly. Obtained mixtures are placed at room temperature for 60 minutes.

2) Drawing of a standard curve: With the blank solutions as controls, the absorbance is measured at a wavelength of 765 nm. With the absorbance as the ordinate and the concentration as the abscissa, a regression curve y=5.983X+0.006 is drawn, and the linear regression variance is calculated.

3) Analysis of a sample solution: 5.0 mL of a Folin-phenol reagent is added into 1.0 mL of a sample solution, and shaken uniformly. The absorbance is measured at a wavelength of 765 nm. The experiment is repeated for several times. The total phenol content (TPC) in a sample is expressed by the milligram equivalent (mg GAE/g dw) of the gallic acid in a dry weight per gram.

In the present disclosure, methods for analysis of the composition of fatty acids and the composition of glycerides in flaxseed oil are as follows.

The composition of the fatty acids is analyzed as follows. A methyl esterification reaction is carried out first. A drop of flaxseed oil is added into a 50 mL round-bottom flask, and 2 mL of a 0.5 M KOH methanol solution is added for reflux in a water bath at 70° C. for 10 minutes. After the reaction is completed, cooling is conducted, and 3 mL of a $BF_3$ methanol solution is added for reflux in a water bath at 70° C. for 5 minutes. After cooling is conducted, 2-3 mL of n-hexane is added, 2 mL of saturated NaCl is added, and after a reaction is carried out for 1 minutes, an appropriate amount of anhydrous sodium sulfate is added. Then, the n-hexane in an upper layer is filtered through a 0.45 μm membrane, put into a sample flask, and subjected to gas phase analysis.

The composition of the glycerides is analyzed as follows. A drop of oil is dissolved in 2 mL of n-hexane. Then, an obtained mixture is filtered through a 0.45 μm membrane, put into a sample flask, and subjected to gas phase analysis.

The content of total sugars in flax meal is determined by using a phenol-sulfuric acid method. 10 mg of standard glucose is accurately weighed in a 100 mL volumetric flask, and distilled water is added to a certain scale line to obtain a solution. The solution is separately sucked in 0.2 mL, 0.4 mL, 0.6 mL, 0.8 mL, 1.0 mL, 1.2 mL, 1.4 mL, and 1.6 mL, and supplemented with water to 2.0 mL. Then, 1.0 mL of 6% phenol and 5.0 mL of concentrated sulfuric acid are added to obtain a mixture. The mixture is subjected to standing for 10 minutes, shaken uniformly, and placed at room temperature for 20 minutes. The absorbance is measured at 490 nm. With 2.0 mL of water as a blank based on same chromogenic operations, the ordinate as the absorbance and the abscissa as the content of glucose (μg), a standard curve equation is obtained by linear regression.

The content of reducing sugar in flax meal is determined by using a 3,5-dinitrosalicylic acid (DNS) method. 50 mg of standard glucose is accurately weighed in a 100 mL volumetric flask, and distilled water is added to a certain scale line to obtain a solution. The solution is separately sucked in 0.1 mL, 0.2 mL, 0.3 mL, 0.4 mL, and 0.5 mL, and supplemented with water to 0.5 mL. Then, 0.5 mL of DNS is added to obtain a mixture. The mixture is heated in a boiling water bath for 5 minutes, taken out, and immediately cooled to room temperature. 4 mL of distilled water is added to each tube, and uniformly mixed thoroughly. The absorbance is measured at 540 nm. With 0.5 mL of distilled water as a blank based on same chromogenic operations, the ordinate as the absorbance and the abscissa as the content of glucose (μg), a standard curve is obtained by linear regression.

The content of polysaccharides is calculated as follows:
content of polysaccharides=content of total sugar-content of reducing sugar
extraction yield of polysaccharides=$(m_1-m_2)/m*100\%$
in the formula, $m_1$ refers to the mass of total sugar of flax, g; $m_2$ refers to the mass of reducing sugar of flax, g; and m refers to the mass of flaxseed meal, g.

EXAMPLE

A method for extracting and separating various components from flaxseed meal based on a subcritical composite solvent includes the following steps.

Figure 2:
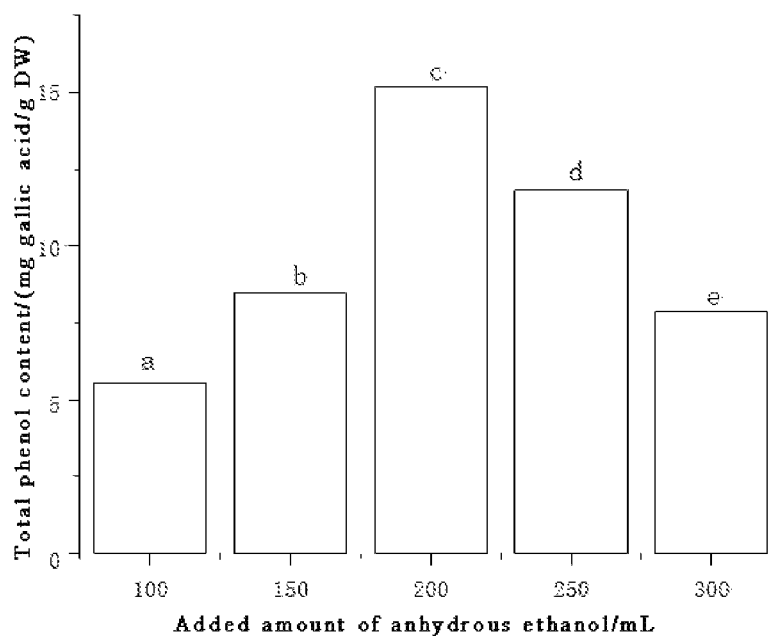
FIG. 2 is a diagram showing optimized results of the ratio of a subcritical composite solvent for extraction of a flax lignan.
Figure 3:
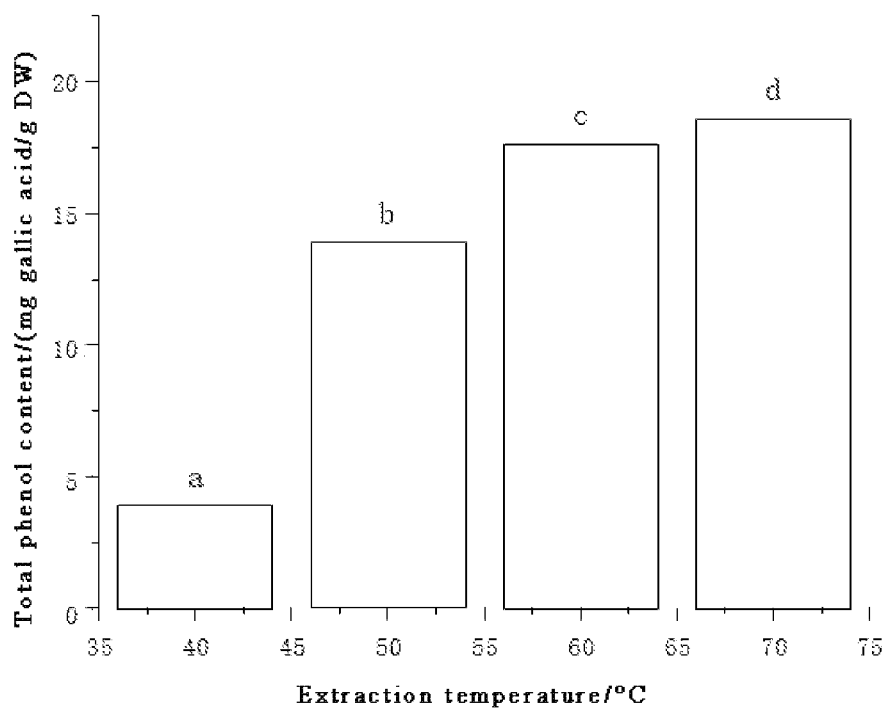
FIG. 3 is a diagram showing optimized results of the extraction temperature for subcritical extraction of a flax lignan.
Figure 4:
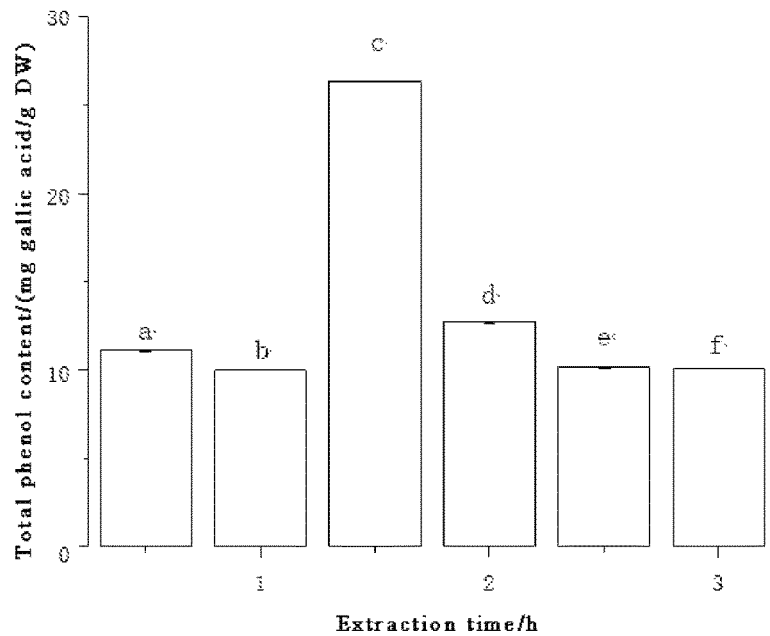
FIG. 4 is a diagram showing optimized results of the extraction time for subcritical extraction of a flax lignan.

(1) 10.0 g ground flaxseed meal was weighed, and put into an extraction bag in a subcritical extraction kettle, and 200 mL of n-butane was added. A single factor test of extraction conditions was carried out to explore the influence of a composite solvent (including n-butane and anhydrous ethanol) at different ratios (as shown in FIG. 2), the extraction temperature (as shown in FIG. 3), and the extraction time (as shown in FIG. 4) on the total phenol content. A response surface design experiment was carried out according to results of optimal values of single factors to obtain optimal conditions of subcritical extraction: the composite solvent includes n-butane and anhydrous ethanol at a ratio of 1:1, the extraction temperature is 69° C., and the extraction time is 2 hours. An obtained sample has a total phenol content of 22.76 mg GAE/g.

After the extraction is completed, a crude lignan extract in an upper extract was concentrated by rotary evaporation at 40° C. to remove the ethanol and a trace mount of the residual n-butane. After being concentrated to a certain volume, the crude lignan extract was subjected to centrifugation at a rotation speed of 10,000 rpm for 10 minutes to obtain a supernatant containing a lignan polymer.

Crude flaxseed oil in a lower extract was obtained.

(2) N-hexane was added to the crude flaxseed oil obtained in step (1) for fractional extraction, and a supernatant was collected and concentrated by rotary evaporation until the volume was unchanged to obtain flaxseed oil.

Figure 8:
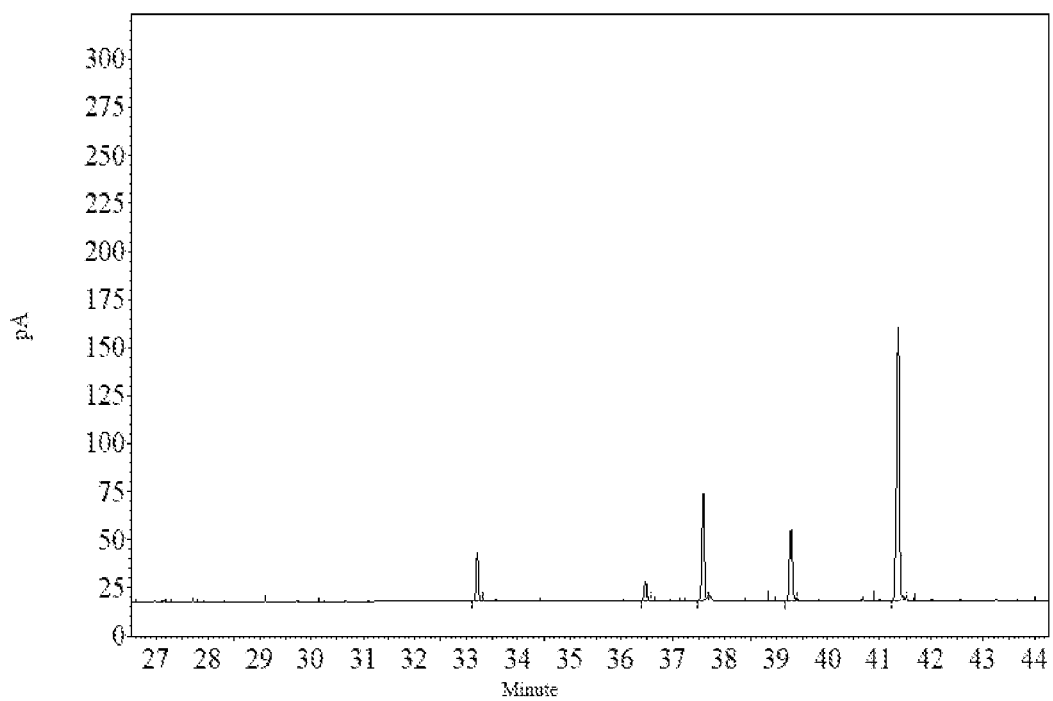
FIG. 8 is a gas chromatogram showing the composition of fatty acids in subcritically extracted flaxseed oil.
Figure 9:
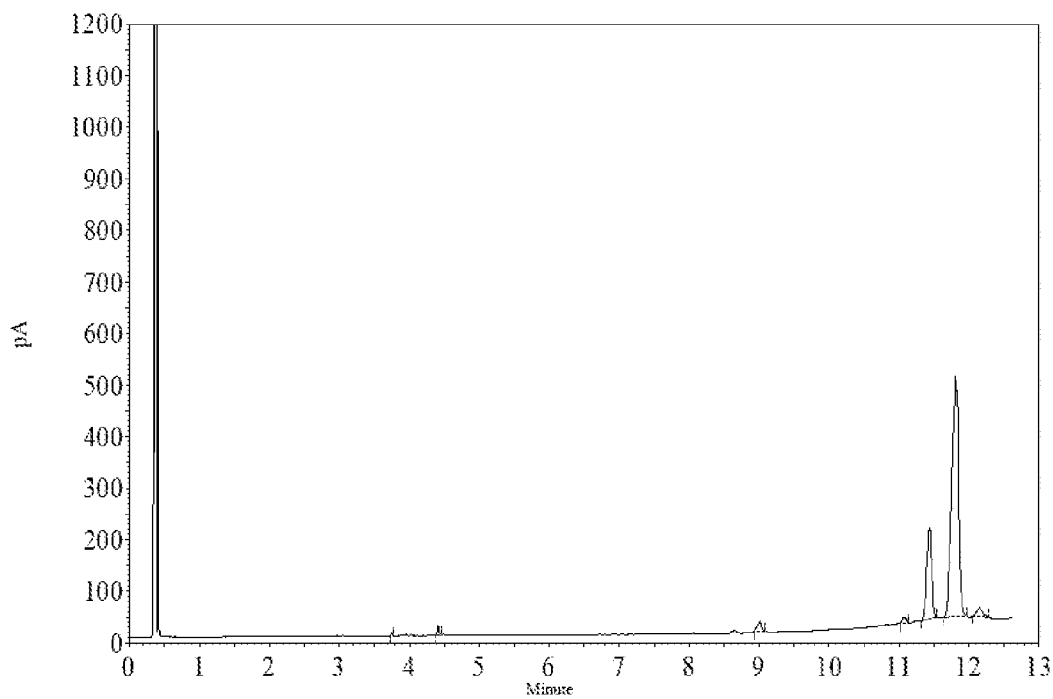
FIG. 9 is a gas chromatogram showing the composition of glycerides in subcritically extracted flaxseed oil.

Gas phase analysis results of the composition of fatty acids and the composition of glycerides in the obtained flaxseed oil are as shown in FIG. 8 and FIG. 9. The fatty acids include palmitic acid 16:0 (7.63%), stearic acid 18:0 (3.27%), oleic acid 18:1 (13.75%), linoleic acid 18:2 (13.75%), and linolenic acid 18:3 (56.32%), and the total content of unsaturated fatty acids is as high as 90%. The glycerides include fatty acid (3.46%), diglyceride (2.60%), and triglyceride (93.83%), which have no significant difference from the composition of commercially available flaxseed oil. Therefore, residual oil subcritically extracted from flax meal with a composite solvent has high yield, good quality, and no organic solvent residue, and an environment-friendly and efficient method for extraction of flaxseed oil is obtained.

(3) The flaxseed meal was removed from the subcritical extraction kettle in step (1), and air-dried or vacuum-dried to obtain flax meal with constant weight. Extraction was conducted with deionized water to obtain flaxseed gum. The flaxseed meal was subjected to water extraction at 70° C., 400 rpm, and a material ratio of 1:25 for 3 hours to obtain flaxseed gum. The content of polysaccharides in the flaxseed gum obtained after the water extraction is 18.19%.

(4) A 0.1 M sodium hydroxide solution that was 5 times the volume of a supernatant was added to the supernatant containing a lignan polymer obtained in step (1) for alkali hydrolysis at room temperature for 24 hours, and glacial acetic acid was added for neutralization until the pH value was 7. It could be obviously observed that when the pH value was close to 7.0, an orange-yellow clear liquid was briefly changed into a lemon-yellow turbid liquid. A neutralized liquid was condensed by vacuum evaporation and then freeze-dried to obtain a crude product of a flax lignan (namely, SDG).

The neutralization with the glacial acetic acid includes that a sample liquid obtained after the alkali hydrolysis was put on a magnetic stirrer, a small amount of AR-grade glacial acetic acid was added for several times under stirring, and real-time monitoring was conducted with precise pH test paper or pH meter.

Figure 5:
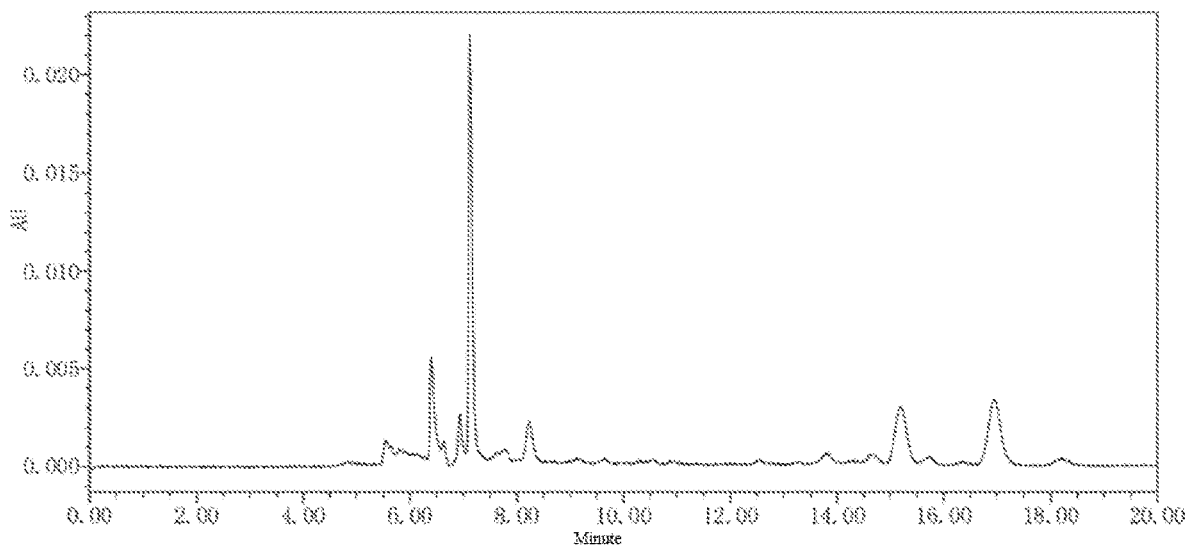
FIG. 5 is a liquid chromatogram showing the content of an SDG obtained after alkali hydrolysis of a subcritically extracted lignan.

The content of an SDG in the neutralized liquid was determined by HPLC, and the extraction rate was 6.99% (as shown in FIG. 5).

5 g of a crude SDG sample was redissolved in 1,000 mL of a 10% ethanol solution to obtain a mixed solution. The mixed solution was treated with 200-300 g of alkaline alumina to remove organic acids, and subjected to suction filtration for 2-3 times to obtain a filtrate. Then, AB-8 macroporous adsorption resin was added for adsorption for 4-10 hours. During the period, intermittent stirring may be conducted with a glass rod. After the adsorption was completed, suction filtration was conducted to obtain macroporous resin. The surface of the resin was rinsed with deionized water for several times, and 1,000 mL of a 70% ethanol solution was added for soaking the resin for 4-10 hours. During the period, intermittent stirring may be conducted with a glass rod to obtain an ethanol solution for precipitating the SDG.

Figure 6:
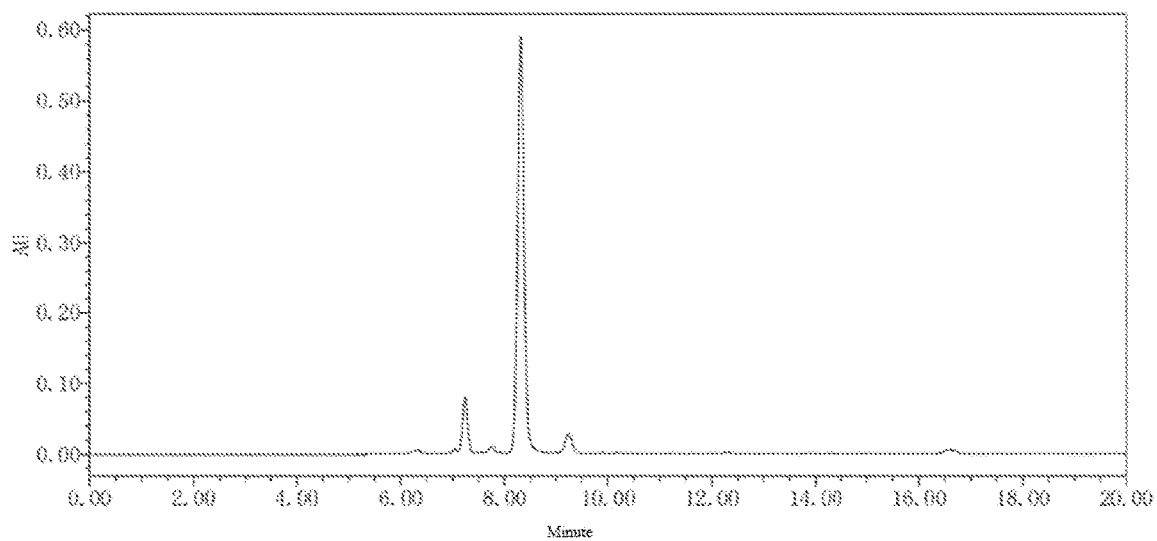
FIG. 6 is a liquid chromatogram of a subcritically extracted lignan treated with alkaline alumina and purified by AB-8 macroporous adsorption resin.

According to monitoring by HPLC, the AB-8 macroporous adsorption resin was treated to obtain an SDG with a sample purity of about 84% (as shown in FIG. 6).

The obtained ethanol solution was concentrated by rotary evaporation at 40° C. until being dry. A silica gel powder that was about 3-5 times the mass of the SDG was added into a flask for column chromatography with silica gel, and gradient elution was separately conducted with a mixture of dichloromethane, methanol, and glacial acetic acid at a volume ratio of 10:1:0.1, a mixture of dichloromethane, methanol, and glacial acetic acid at a volume ratio of 10:2:0.1, and a mixture of dichloromethane, methanol, and glacial acetic acid at a volume ratio of 10:2.5:0.1.

According to the column chromatography, a standard SDG product was used as a control, and an eluent was sucked by a glass spotting capillary tube with an inner diameter of 0.3 mm. The eluent was subjected to chromatographic separation by using a silica gel thin layer chromatography plate with a mixture of dichloromethane, methanol, and glacial acetic acid at a ratio of 10:3:0.1 as a developing agent. After the chromatography was completed, ultraviolet chromogenic analysis was conducted under an ultraviolet lamp at 254 nm. According to analysis results of a TLC method, the polarity of an elution agent was gradually adjusted, and gradient elution was separately conducted with dichloromethane, a mixture of dichloromethane, methanol, and glacial acetic acid at a ratio of 10:1:0.1 (V/V/V), a mixture of dichloromethane, methanol, and glacial acetic acid at a ratio of 10:2:0.1 (V/V/V), and a mixture of dichloromethane, methanol, and glacial acetic acid at a ratio of 10:2.5:0.1 (V/V/V). An eluent was collected at 40 mL/tube until an SDG component was completely eluted. All tube solutions including the SDG component were collected, concentrated under reduced pressure, and dried. The residual solvent was removed by using a vacuum pump, and the purity was determined by using a high performance liquid chromatography method.

Figure 7:
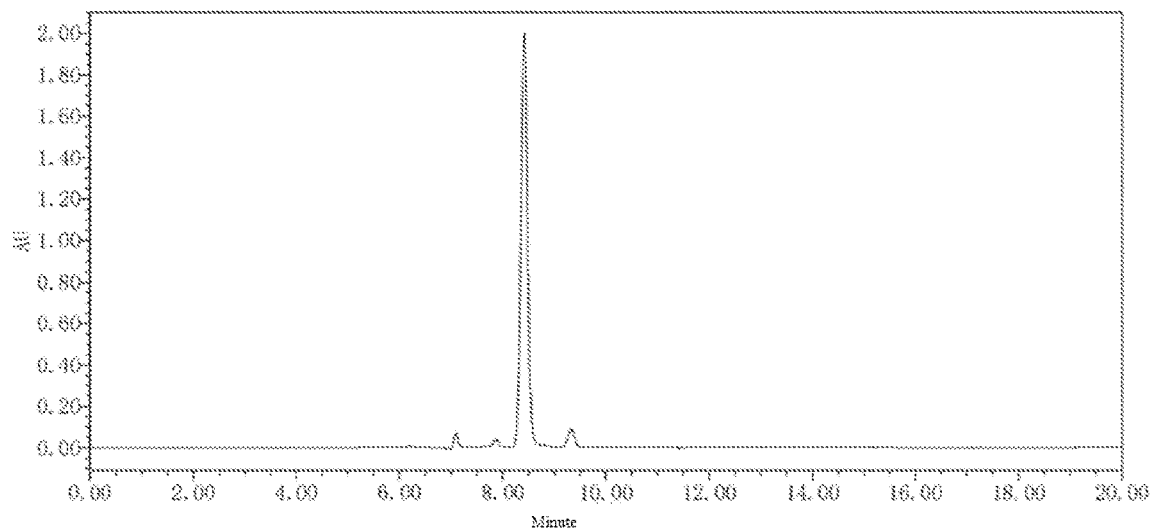
FIG. 7 is a liquid chromatogram of a subcritically extracted lignan purified by column chromatography with silica gel.

The SDG with a purity of 84% was subjected to column chromatography with silica gel to obtain an SDG with a purity of about 94% (as shown in FIG. 7).

It was calculated that the content of the flax lignan, namely the SDG, in the flax meal was 4.19 mg/g.

The above example is a preferred embodiment of the present disclosure, but the embodiments of the present disclosure are not limited by the above example. Any other changes, modifications, substitutions, combinations, and simplifications made without departing from the spirit essence and principle of the present disclosure shall be considered as equivalent replacements, and are all included within the protection scope of the present disclosure.

What is claimed is:

1. A method for extracting and separating various components from flaxseed meal based on a subcritical composite solvent, comprising the following steps:

(1) adding an extraction agent to flaxseed meal for subcritical extraction, and after the extraction is completed, obtaining a crude lignan extract in an upper extract and crude flaxseed oil in a lower extract, wherein the extraction agent comprises n-butane and anhydrous ethanol at a volume ratio of 1:1;

(2) adding n-hexane to the crude flaxseed oil obtained in step (1) for fractional extraction to obtain a supernatant, and subjecting the supernatant to concentration by rotary evaporation until the volume is unchanged to obtain flaxseed oil; and (3) subjecting the flaxseed meal used after step (1) to hot water extraction to obtain flaxseed gum.

2. The extraction and separation method according to claim 1, wherein in step (1), the subcritical extraction is conducted at 69° C. for 2 hours.

3. The extraction and separation method according to claim 1, wherein the obtained crude lignan extract is subjected to rotary evaporation to remove the residual extraction agent, and then subjected to centrifugation to obtain a supernatant containing a lignan polymer; and the supernatant is subjected to alkali treatment, acid neutralization, chromatography with macroporous adsorption resin, and column chromatography with silica gel to obtain a lignan.

4. The extraction and separation method according to claim 3, wherein the column chromatography with silica gel comprises conducting elution with dichloromethane, a mixture of dichloromethane, methanol, and glacial acetic acid at a ratio of 10:1:0.1 (V/V/V), a mixture of dichloromethane, methanol, and glacial acetic acid at a ratio of 10:2:0.1 (V/V/V), and a mixture of dichloromethane, methanol, and glacial acetic acid at a ratio of 10:2.5:0.1 (V/V/V) in sequence, and collecting all tube solutions comprising a secoisolariciresinol diglucoside (SDG) component.

5. The extraction and separation method according to claim 3, wherein the alkali treatment comprises adding a 0.1 M sodium hydroxide solution for alkali hydrolysis at room temperature for at least 24 hours.

6. The extraction and separation method according to claim 3, wherein the acid neutralization comprises adding acetic acid until the pH value of the system is 7.

7. The extraction and separation method according to claim 3, wherein the chromatography with macroporous adsorption resin comprises adsorption with AB-8 macroporous resin.

8. The extraction and separation method according to claim 7, wherein the chromatography with macroporous adsorption resin comprises elution with an ethanol solution with a V/V percentage of 70% to obtain an eluent containing a lignan.

9. The extraction and separation method according to claim 1, wherein in step (2), the fractional extraction is conducted at 70° C. for 3-5 hours.

10. The extraction and separation method according to claim 1, wherein in step (3), the hot water extraction comprises water extraction at 70° C., 400 rpm, and a material-liquid ratio of 1:25 for 2 hours.

* * * * *